Figure 1:
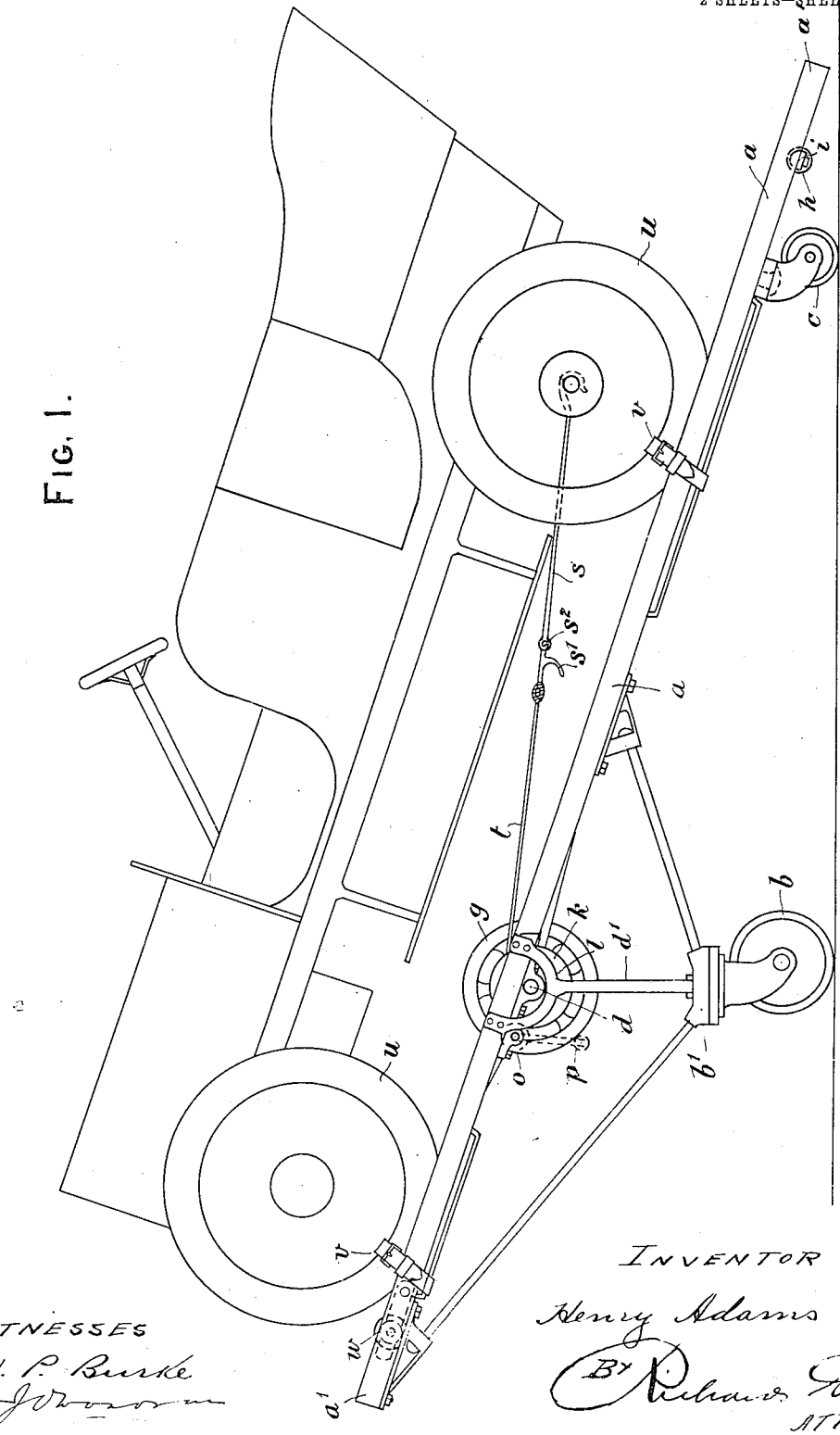

No. 837,372. PATENTED DEC. 4, 1906.
H. ADAMS.
MEANS FOR ELEVATING AND TRANSPORTING MOTOR ROAD VEHICLES.
APPLICATION FILED APR. 13, 1906.

2 SHEETS—SHEET 1.

WITNESSES
W. P. Burke
W. J. ⎯⎯

INVENTOR
Henry Adams
By Richards &c.
ATTY's

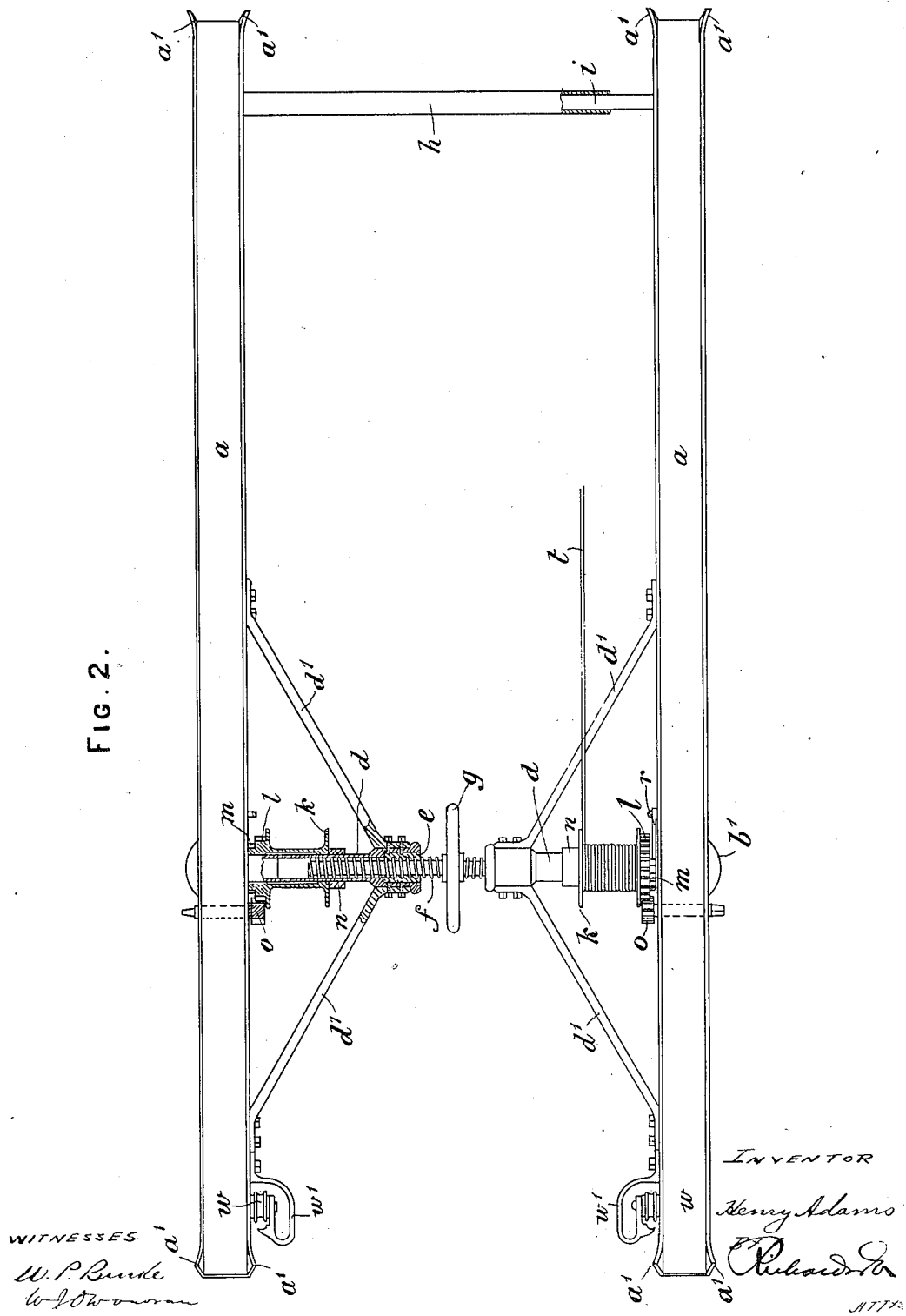

UNITED STATES PATENT OFFICE.

HENRY ADAMS, OF TUNBRIDGE WELLS, ENGLAND.

MEANS FOR ELEVATING AND TRANSPORTING MOTOR ROAD-VEHICLES.

No. 837,372.  Specification of Letters Patent.  Patented Dec. 4, 1906.

Application filed April 13, 1906. Serial No. 311,534.

*To all whom it may concern:*

Be it known that I, HENRY ADAMS, a subject of the King of Great Britain, residing at 30 Monson Colonnade, Tunbridge Wells, in the county of Kent, England, have invented certain new and useful Improvements in Means for Elevating and Transporting Motor Road-Vehicles, of which the following is a specification.

My invention relates to improvements in means or apparatus for readily elevating motor road-vehicles so as to enable repairs to be effected or the machinery inspected from underneath, such means or apparatus also serving as an appliance for transporting or maneuvering a disabled or other car and for loading cars upon a railway and other vehicles, and for similar purposes.

My invention consists in the improved construction, arrangement, and combination of parts hereinafter described with reference to the accompanying drawings and as claimed.

Figure 1 is an elevation, and Fig. 2 is a plan.

A pair of trough-section or channel tracks $a$ are supported upon wheels, preferably of the caster type, $b$ $c$, as shown in Fig. 1, so as to render the apparatus readily movable, suitable struts and tie-bars being employed to insure the necessary rigidity and strength. The channel-tracks $a$ are carried in an inclined position, as shown in Fig. 1, the arrangement of the vertical pivotal axes of the rear casters $c$ being such that when the wheels are behind the axes the lower ends of the guides $a$ are clear of the ground, but when the wheels are in advance of said axes the lower ends of the guides more nearly approach or come in contact with the ground. The object of this arrangement is to present no appreciable obstacle or resistance either when the apparatus is being moved or when a car is being drawn or propelled thereonto. The ends $a'$ of the tracks are preferably opened outward, as shown in Fig. 2.

The two channel-tracks $a$ are connected together in a substantial manner, and so that they may be separated more or less, according to the width or distance between the wheels of any particular vehicle. For this purpose I fix to both tracks a tubular strut $d$, which is braced to the tracks $a$ by stay-rods $d'$, and also to the crowns $b'$ of the caster-wheels $b$. Within the adjacent ends of the struts $d$ are fixed nuts $e$, through which a right and left handed screw-rod $f$ is passed, meshing therewith and approximately fitting the interior of the struts $d$. A hand-wheel $g$ is provided whereby to rotate said screw-rod $f$ and thereby regulate the width between the channel-tracks. There is also provided a telescoping strut consisting of a length of tube $h$, fixed rigidly to one track and a length of bar $i$, fitting the tube $h$ and rigidly fixed to the other track. The telescopic strut serves to insure the parallelism of the two tracks.

Upon the tubular struts $d$, Fig. 2, are mounted a pair of winding-drums $k$, which are each integral with a toothed wheel $l$ and a ratchet-wheel $m$. The drums $k$ are free to rotate upon the struts $d$, being held in position by the adjustable collars $n$. The drums $k$ are rotated by means of toothed pinions $o$, meshing with said toothed wheels $l$, the pinions being rotated by suitable crank-handles $p$, (dotted lines, Fig. 1.) Pawls $r$ are provided to prevent the drums $k$ running back.

When it is desired to elevate a vehicle, the apparatus is brought thereto and maneuvered into position. The hooked bar $s$, Fig. 1, of one wire rope $t$, or both, is engaged with the rear axle, as shown, and the winding up effected by the crank-handle. A simple hook may be employed instead of the bar $s$; but the latter offers great facilities in engaging the hook thereof with the rear axle. When the car has been moved up the inclined tracks to the desired position, the wheels $u$ are secured by buckle-straps $v$, which are adjusted to the required position. The car may now be transported bodily upon and by means of the apparatus to the desired situation, thus providing a ready means for transporting a broken down or damaged car from the road to the more convenient repair-shop.

When used for loading purposes such as upon railways, the apparatus with or without the vehicle thereupon is wheeled up to the railway wagon or truck with the upper end of the inclined tracks $a$ projecting over or upon the wagon-floor. The ropes $t$ are passed from the drums $k$ over snatch-pulleys $w$, fixed to the tracks, and back again to the axle of the car, using the hook $s'$, to which the hooked bar $s$ is pivoted at $s^2$. After tautening the ropes and liberating the buckle-straps $v$ the winding is proceeded with, drawing the car upward and onto the railway-wagon. The parts $w'$ of the snatch-pulleys $w$ serve as handles by which the apparatus may be maneuvered.

I claim—

1. Apparatus for elevating and transporting motor road-vehicles, comprising a pair of channel-tracks mounted in an inclined position upon wheels, a tubular strut on each track, a screw-threaded rod connecting said struts and means for rotating said screw-threaded rod, a pair of winding-drums, means for rotating said drums, and a telescopic strut for guiding the extension of the tracks.

2. The combination with a pair of inclined channel-tracks mounted upon wheels, a pair of tubular struts fitted with screw-extending mechanism, and a telescopic guiding-strut, of a pair of winding-drums mounted to rotate upon said tubular struts, spur-gearing and crank-handles for said winding-drums, and a ratchet-and-pawl device for each of said drums.

3. The combination with a pair of inclined channel-tracks mounted upon wheels, extendible as regards width by means of a screw and guided by a telescopic strut, of a pair of winding-drums mounted to rotate upon the tubular struts and means for rotating and checking said drums, a wire rope for each of said drums, a hook on the end of each rope and adjustable means for securing the wheels of the elevated vehicle.

4. The combination with a pair of inclined channel-tracks mounted upon wheels and extendible as regards width, and provided with winding-drums and rotating and checking mechanism therefor, of a wire rope for each of said drums, a hook on the end of each rope, a hooked bar pivoted to each of said hooks, a pair of snatch-pulleys fixed to the tracks, and a pair of handles for maneuvering the apparatus.

In testimony whereof I have hereunto set my hand in presence of two subscribing witnesses.

HENRY ADAMS.

Witnesses:
GEORGE C. DOWNING,
WALTER J. SKERTEN.